US012631911B2

(12) United States Patent
Patel et al.

(10) Patent No.: US 12,631,911 B2
(45) Date of Patent: May 19, 2026

(54) INTEGRATION OF ADVANCED PHOTONIC MATERIALS IN SILICON PHOTONIC PLATFORM

(71) Applicant: Cisco Technology, Inc., San Jose, CA (US)

(72) Inventors: Vipulkumar K. Patel, Breinigsville, PA (US); Ming Gai Stanley Lo, Breinigsville, PA (US); Mark A. Webster, Bethlehem, PA (US); Farnood Khalilzadeh Rezaie, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 453 days.

(21) Appl. No.: 18/297,321

(22) Filed: Apr. 7, 2023

(65) Prior Publication Data

US 2024/0337870 A1 Oct. 10, 2024

(51) Int. Cl.
*G02F 1/035* (2006.01)
*G02B 6/12* (2006.01)
*G02F 1/025* (2006.01)

(52) U.S. Cl.
CPC ......... *G02F 1/035* (2013.01); *G02B 6/12002* (2013.01); *G02B 6/12004* (2013.01); *G02F 1/025* (2013.01); *G02F 2202/20* (2013.01)

(58) Field of Classification Search
CPC .. G02F 1/035; G02B 6/12002; G02B 6/12004
USPC .............................................. 385/1–3, 9, 14
See application file for complete search history.

(56) References Cited

U.S. PATENT DOCUMENTS

| | | | |
|---|---|---|---|
| 10,788,689 B1 | 9/2020 | Lentine et al. | |
| 12,147,083 B2 * | 11/2024 | Sharma | H10B 41/00 |
| 2003/0228088 A1 * | 12/2003 | Liu | G02F 1/313 |
| | | | 385/16 |
| 2004/0155252 A1 * | 8/2004 | Yap | G02F 1/011 |
| | | | 257/82 |
| 2006/0222281 A1 | 10/2006 | Deliwala | |
| 2017/0139132 A1 * | 5/2017 | Patel | G02B 6/4206 |
| 2017/0139142 A1 * | 5/2017 | Patel | G02B 6/12004 |
| 2021/0286203 A1 * | 9/2021 | Safian | G02B 6/13 |
| 2022/0163827 A1 | 5/2022 | Sugiyama | |
| 2022/0252913 A1 | 8/2022 | Lo et al. | |
| 2022/0317483 A1 * | 10/2022 | Chakravarty | G02F 1/035 |
| 2022/0357514 A1 | 11/2022 | Kumar | |

(Continued)

FOREIGN PATENT DOCUMENTS

| | | | | |
|---|---|---|---|---|
| CN | 114660836 A | * | 6/2022 | G02B 6/42 |
| WO | 2021178959 A1 | | 9/2021 | |

OTHER PUBLICATIONS

Di Zhu et al., "Integrated photonics on thin-film lithium niobate," Adv. Opt. Photon. 13, 242-352 (2021).

(Continued)

*Primary Examiner* — Robert Tavlykaev
(74) *Attorney, Agent, or Firm* — Patterson + Sheridan, LLP

(57) ABSTRACT

Embodiments herein describe a photonic platform having a chiplet with a Pockels effect electro-optic layer made of LN or BTO and a substrate. The chiplet is bonded to a photonic wafer which includes a waveguide. In this manner, a ridge waveguide formed by the Pockels effect electro-optic layer and the waveguide utilizes electro-optic effects to tune a signal.

19 Claims, 14 Drawing Sheets

(56) References Cited

U.S. PATENT DOCUMENTS

| | | |
|---|---|---|
| 2022/0382083 A1 | 12/2022 | Wooten |
| 2024/0210743 A1* | 6/2024 | Ji ............................ G02F 1/0316 |
| 2024/0220840 A1* | 7/2024 | Jacob ...................... G02F 1/353 |
| 2025/0164829 A1* | 5/2025 | Siew ........................ G02F 1/035 |

OTHER PUBLICATIONS

Gengxin Chen et al., "High performance thin-film lithium niobate modulator on a silicon substrate using periodic capacitively loaded traveling-wave electrode," APL Photonics 7, 026103 (2022) Published Online: Feb. 2, 2022, pp. 1-9.

Fleix Eltes et al., "A BaTiO3-based electro-optic Pockels modulator monilithically integrated on an advanced silicon photonics platform," Journal of Lightwave Technology, IEEE, Year: 2019, pp. 1456-1462.

Abel, Stefan, et al. "Electro-optical active barium titanate thin films in silicon photonics devices." Integrated Photonics Research, Silicon and Nanophotonics. Optica Publishing Group, 2013. pp. 1-3.

F. Eltes et al., "A novel 25 Gbps electo-optic Pockels modulator integrated on an advanced Si photonic platform," IEEE, Year: 2017, pp. 1-4.

European Search Report for European Application No. 24168867.0, dated Aug. 9, 2024, 11 Pages.

Mere V., et al., "Design and Fabrication of Hybrid Lithium Niobate Electro-Optic Modulators", 2022 IEEE International Conference on Emerging Electronics (ICEE), IEEE, Dec. 11, 2022 (Dec. 11, 2022), 4 Pages, XP034342837, DOI: 10.1109/ICEE56203.2022.10117674 [retrieved on May 15, 2023], The whole document.

* cited by examiner

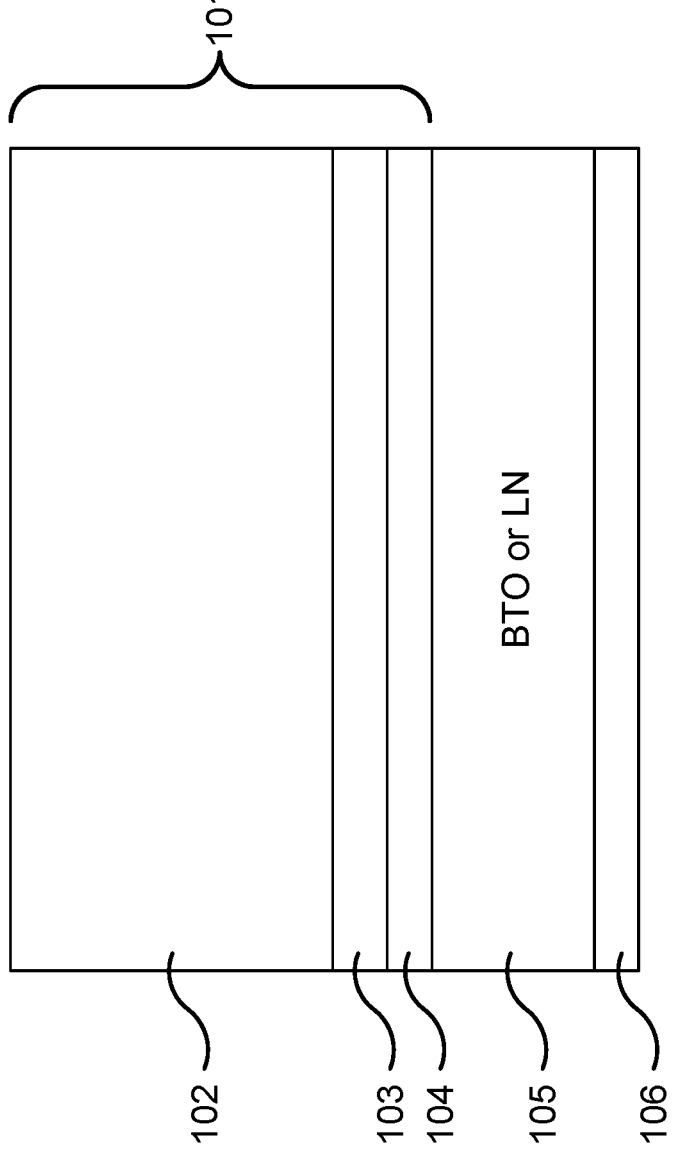
BTO or LN
FIG. 1
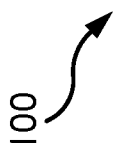

INTEGRATION OF ADVANCED PHOTONIC MATERIALS IN SILICON PHOTONIC PLATFORM

TECHNICAL FIELD

Embodiments presented in this disclosure generally relate to silicon photonics. More specifically, embodiments disclosed herein relate to middle-end-of-line (MEOL) integration of Lithium niobate and Barium titanate thin films in silicon photonic waveguides.

BACKGROUND

As the growth in the volume of communication network traffic continually increases, the need for development of network components to support the increased traffic also increases. Network connectivity speeds continue to increase to facilitate this growth in traffic as networks transition from 10G to 100G to 800G and beyond. Current Silicon photonic technologies based on P-type, intrinsic, and N-type (PIN) or silicon-insulator-silicon capacitor (SISCAP) based modulators n support 224G serializer/deserializer (SERDES) speeds. However, material, structural, and other limitations of the current silicon photonic platforms present a challenge to future implementations of higher network traffic speeds. A silicon photonic platform that includes electro-optic materials could overcome many of the limitations of photonic platforms that rely solely on silicon materials. An additional benefit would be the integration of electro-optic materials during middle-end of line (MEOL) processes.

For example, silicon is self-limiting as a medium for optical modulation. Silicon exhibits two-photon absorption effects that result in free carrier absorption. Two photon absorption is a non-linear effect occurring within an optical waveguide that increase optical loss within the optical waveguide. Silicon modulators also have low energy efficiency due to permanent injection currents. Furthermore, silicon modulators employing a reverse biased p-n junction require a long phase modulation length in excess of 1 mm. The large footprint required by these devices is not suitable for high density optical circuits. Finally, forward biased PIN diodes suffer from low modulation speeds. The effect of these limitations is that silicon optical modulators suffer from poor function in high-speed modulation and non-linear modulation.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1 illustrates a Lithium niobate (LN) or Barium titanate (BTO) wafer according to one embodiment described herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 2:
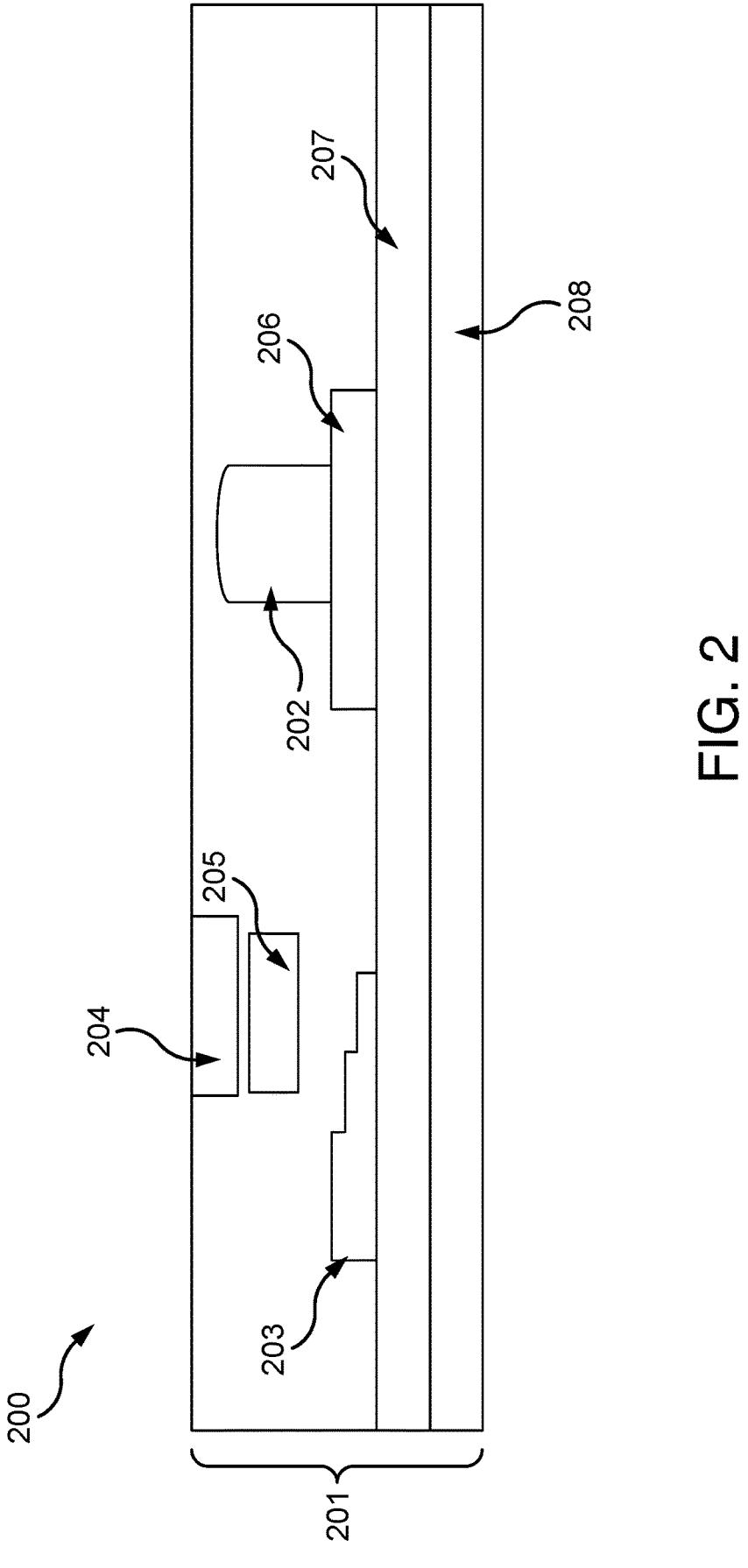
FIG. 2 illustrates a silicon photonic waveguide according to one embodiment described herein.

One embodiment presented in this disclosure includes a method of manufacturing a photonic platform. The method includes providing a chiplet that includes a Pockels effect electro-optic layer and a substrate, bonding the chiplet to a photonic wafer such that the Pockels effect electro-optic layer is optically coupled to a waveguide disposed within the photonic wafer, and removing the substrate after bonding the chiplet to the photonic wafer.

Another embodiment presented in this disclosure is silicon photonic platform that includes a semiconductor wafer comprising a waveguide, a Pockels effect electro-optic layer disposed over, and optically coupled to, the waveguide, a first electrode electrically coupled to a first end of the Pockels effect electro-optic layer, and a second electrode electrically coupled to a second end of the Pockels effect electro-optic layer where a wafer bondline is disposed between the Pockels effect electro-optic layer and the waveguide.

EXAMPLE EMBODIMENTS

As described above silicon-based modulators are commonly integrated into photonic devices. The silicon platform combines photonic and electronic elements on the same chip while capitalizing on a mature silicon wafer industry. The combination of developed silicon wafer manufacturing techniques and the well-known qualities of silicon semiconductors allows for low-cost production. However, silicon based optical modulators suffer from poor function in high-speed modulation and non-linear modulation.

As the growth in the volume of communication network traffic continually increases, the need for development of network components to support the increased traffic also increases. Network connectivity speeds continue to increase to facilitate this growth in traffic. However, material, structural, and other limitations of the current silicon photonic platforms present a challenge to future implementations of higher network traffic speeds. The limitations of silicon photonic platforms are inherent to silicon. Silicon photonic platforms suffer from poor performance where high-speed modulation or non-linear modulation is useful.

The examples and embodiments that follow include Pockels effects based devices permit high-speed, low-power electro-optical modulation and are effective non-linear modulators. Materials such as LN and BTO exhibit Pockels Effects. The application of LN or BTO within photonic platforms offers several advantages. One such advantage is that LN or BTO modulates optical signals through an electro-optic effect. The electro-optic effect permits modulation of a signal through change in phase shift due to an alteration of the refractive index of a crystal by an applied electric field. The electro-optic effects of the crystal can be broadly classified as either longitudinal electro-optic effects or transverse electro-optic effects. Longitudinal electro-optic effects describe changes to the crystal when an electric field is applied along the propagation direction of light. Transverse electro-optic effects describe changes to the crystal when an electric field is applied perpendicular to the direction of propagation of the light. Electro-optic effects have very short response times, on the order of 1010 Hz. This very fast response time permit high-speed modulation of a propagating signal. Electro-optic materials exhibit modification of the refractive index of the material by the application of a direct current (DC) or low frequency electric field. The applied low frequency electric field is much lower than the optical frequency.

Generally, for electro-optic materials a modification of the refractive index may occur through polarization. The magnitude of material polarization is proportional to the strength of an applied electric field. The magnitude of the material polarization as a function of the applied external electric field is:

$$|\vec{P}| = \epsilon_0 \chi_e |\vec{E}| + \epsilon_0 \chi^{(2)} |\vec{E}|^2 + \epsilon_0 \chi^{(3)} |\vec{E}|^3$$

$+ \ldots$ The effect due to the $$\epsilon_0 \chi^{(2)} |\vec{E}|^2$$

term is the Pockels effect. Pockels effect exhibits material polarization as a function of the square of the external field. The Pockels effect or Pockels electro-optic effects materializes as a change in birefringence induced by the electric field. An electric field causes electron or crystal lattice displacements which result in changes in the refractive index. The index of refraction ($n_{eo}$) attributed to the Pockels effect is estimated by:

$$n_{eo} = n_x \left(1 - \frac{1}{2}\gamma n_x^2 |E| - \frac{1}{2}sn_x^2|E|^2\right).$$

Where $n_x$ is the index of refraction, $\gamma$ is the Pockels coefficient having units m/V, E is the applied electric field, and s is the Kerr coefficient having units $m^2/V^2$. From this equation the change in the applied electric field alters the index of refraction by the Pockels effect term:

$$\frac{1}{2}\gamma n_x^2 |E|.$$

By altering the index of refraction, Pockels effect materials like LN or BTO can alter the phase, frequency, amplitude, and/or polarization of the effected signal.

The embodiments described herein include a silicon photonic platform that includes a waveguide. The waveguide includes a LN or BTO layer for modulation of an optical signal carried by a silicon waveguide. Together the LN or BTO layer and the silicon nitride layer form a ridge waveguide that modulates optical signals more efficiently, is easier to construction, and utilizes MEOL processes to improve manufacturing.

FIG. 1 illustrates a wafer 100 that has a substrate 101 and an electro-optical layer 105. The substrate 101 can have silicon substrate with option of having additional dielectric layer 103 (e.g., silicon dioxide) and an optional silicon layer 104. The electro-optical layer 105 can be LN or BTO. An optional dielectric layer 106 can be also deposited or formed on layer 105 to improve bonding properties of the final surface. For example, the dielectric layer 106 can be used to bond the structure to another wafer. As discussed in more detail below, multiple chiplets can be cut from the wafer 100 and be placed (bonded) on a larger photonic platform in a manner where the LN or BTO layer 105 becomes part of a ridge waveguide.

LN and BTO are electro-optic materials and the placement of the chiplet on a larger photonic platform is more simple, efficient, and effective than growing a LN or BTO layer directly on the larger photonic platform. Unlike silicon-based waveguides that rely on dopants to provide charges facilitating their functionality, LN or BTO waveguides use an applied electric field. Both LN and BTO exhibit electro-optic effects due to Pockels Effect. The ability of LN and BTO materials to change their bifringence through the application of an electric field creates efficient electro-optic modulators. Some benefits of this approach are that a LN or BTO electro-optic layer is not grown on the photonic platform and avoids typical semiconductor manufacturing steps such as deposition, photoresist, lithography etching, and ionization.

Additional qualities of LN that make it an attractive material are LN has a melting point of 1250° C., a trigonal crystal system, a no refractive index of 2.30, and a ne refractive index of 2.21. In addition to electro-optic modulators, other applications for LN include high-performance acoustic wave filters. For electro-optical modular applications, thin film LN on insulator wafers (e.g., where the structure includes a silicon substrate/dielectric/LN layer) offer small size, stability, large bandwidth, high transmission rate, low power consumption, compatibility with CMOS driving voltage, and enabling optical integration. Thin film LN wafers can be fabricated using a smart cut process by transferring a thin film of LN layer on a silicon wafer with insulator (typically oxide).

In another embodiment, BTO is used as the electro-optical material to make high-speed electro-optic modulators. BTO is a ferroelectric, pyroelectric, and piezoelectric ceramic material that has a melting point of 1,625° C., a tetragonal crystal system, a no refractive index of 2.412, and a ne refractive index of 2.360. BTO enables Pockels-effect-based devices on silicon. Some of the benefits of applying BTO is its large Pockels coefficients, BTO can be grown on silicon substrates with large wafer sizes, and BTO exhibits excellent crystal quality. BTO is also a chemically and thermally stable material. BTO can be grown on wafers having a range of wafer diameters from 50 mm to 300 mm independent of the diameter of the photonic platform wafer. BTO can be grown on silicon or insulator surface with good crystal quality.

FIG. 2 illustrates a photonic platform silicon on insulator (SOI) wafer 201 of a device 200 constructed by a front end of line (FEOL) process. The wafer 201 includes a photodiode 202 (e.g., a germanium photodiode) and a plurality of waveguides 203, 204, 205, 206, a buried oxide layer 207 and a silicon substrate 208. The waveguide 204 can be a silicon nitride waveguide or silicon waveguide. The waveguide 205 is an optional second silicon nitride waveguide. The waveguide 203 is a multi-level silicon waveguide and can be used to form grating couplers or wave-guiding structures. In one embodiment, the silicon waveguide 203 has a thickness less than 400 nm. Photodiode 202 can also be integrated in the photonics platform wafer.

Integration of thin film LN or BTO as part of a Middle End of Line (MEOL) process flow includes bonding LN or BTO chiplets after the FEOL which includes the formation of the Si and nitride waveguides 203, 204, 205, 206, germanium photodiode epitaxial and implants/anneals and prior to BEOL (Back End of Line) processing which includes metallization, Interlayer dielectric (ILD) formation and in some cases, wafer-to-wafer bonding.

Figure 3:
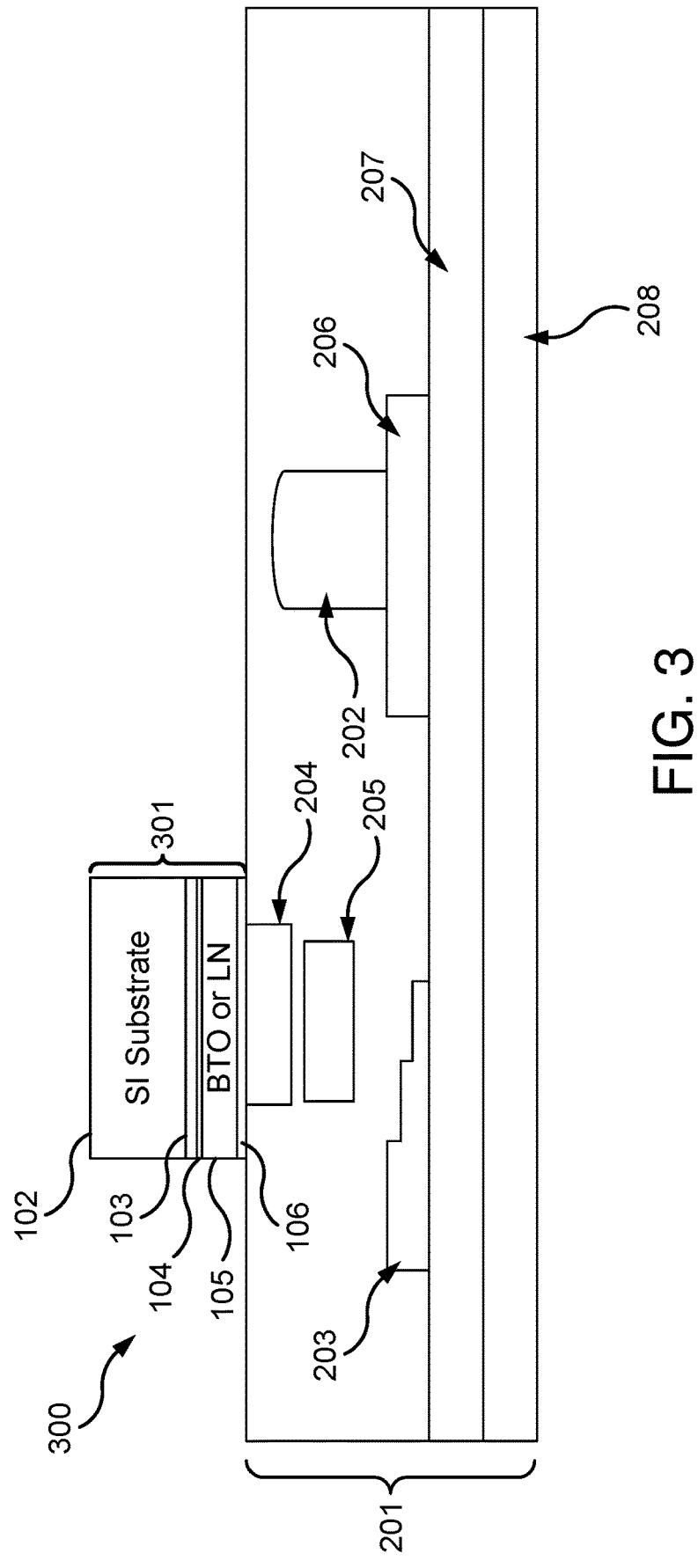
FIG. 3 illustrates the integration of a LN or BTO chiplet with the silicon photonic waveguide into a photonic platform according to one embodiment described herein.

FIG. 3 illustrates one embodiment of MEOL attachment of a LN or BTO chiplet 301 to the photonic platform silicon wafer 201 to form a device 300. It should be noted here that other MEOL implementation of integration of LN or BTO chiplets on 210 are also possible. The chiplet 301 is bonded at a bond line at a top surface of the wafer 201.

As depicted in FIG. 1, from the LN or BTO wafer 100, a plurality of smaller LN or BTO chiplets 301 are manufactured. A single LN or BTO chiplet 301 die can be cut from the larger LN or BTO wafer 100. Each LN or BTO chiplet 301 has the same layers of the LN or BTO wafer 100. However, as described earlier, the layers 104 and 106 can be optional. The layers 103 and 106 can be made of silicon oxide or silicon nitride or any other integrated circuit fabrication compatible dielectric layers. The dimensions of the LN or BTO chiplets 301 is sized to match the required optic-electric signals carried by the waveguide. In this example, each chiplet 301 is bonded to the photonic wafer 201 in a MEOL process to form an electro-optic connection with waveguide 204. The union of the LN or BTO layer 105 with waveguide 204 forms a ridge waveguide structure capable of modulating the phase of the waveguide signal.

Figure 4A:
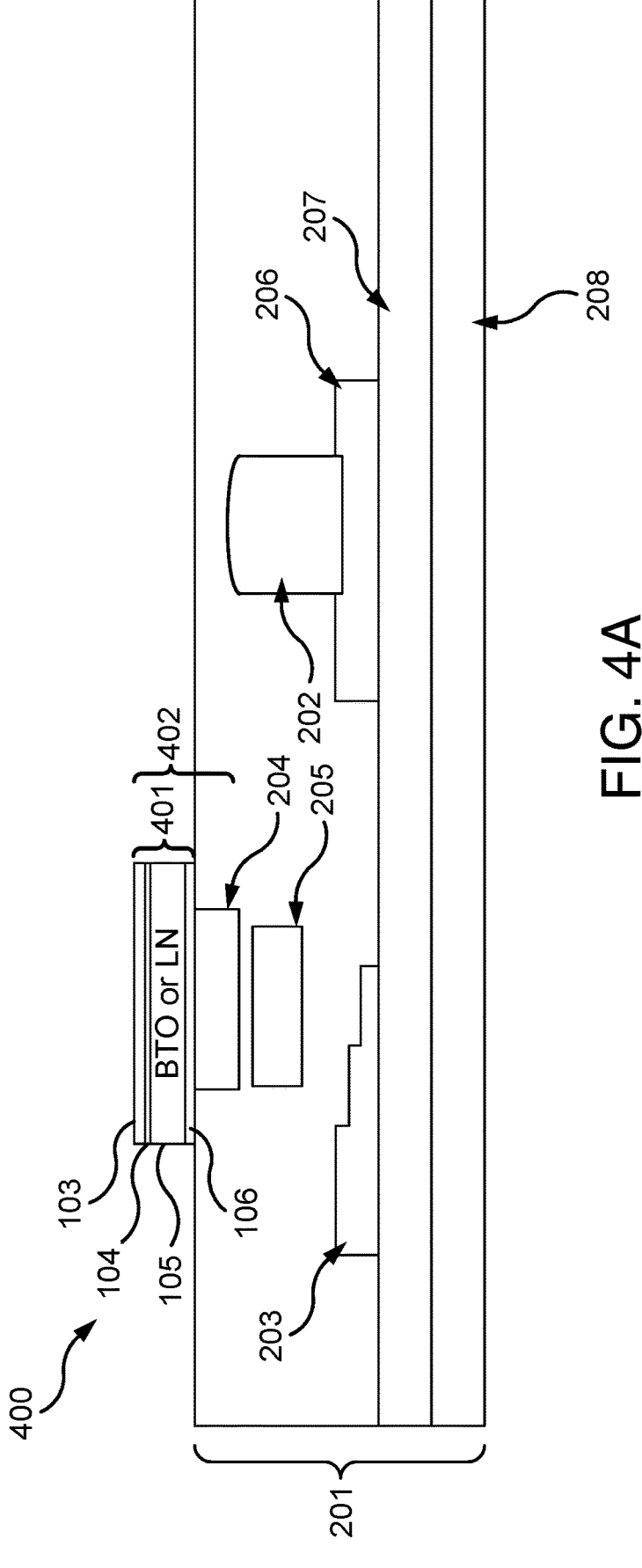
FIGS. 4A-4C illustrate further processing of the photonic platform according to embodiments described herein.

FIG. 4A illustrates the MEOL step of removing the first layer 102 (e.g., the substrate) of a device 400. After attachment of the LN or BTO chiplet 401 to the photonic wafer 201, the first layer 102 is removed. The final configuration of is a chiplet 401 electro-optically connected to the first nitride waveguide 204 forming a ridge waveguide 402. The ridge waveguide 402, at a minimum, the LN or BTO layer 105, and nitride waveguide 204. Much like the device depicted in FIG. 1, the layers 104 and 106 may be omitted.

Figure 4B:
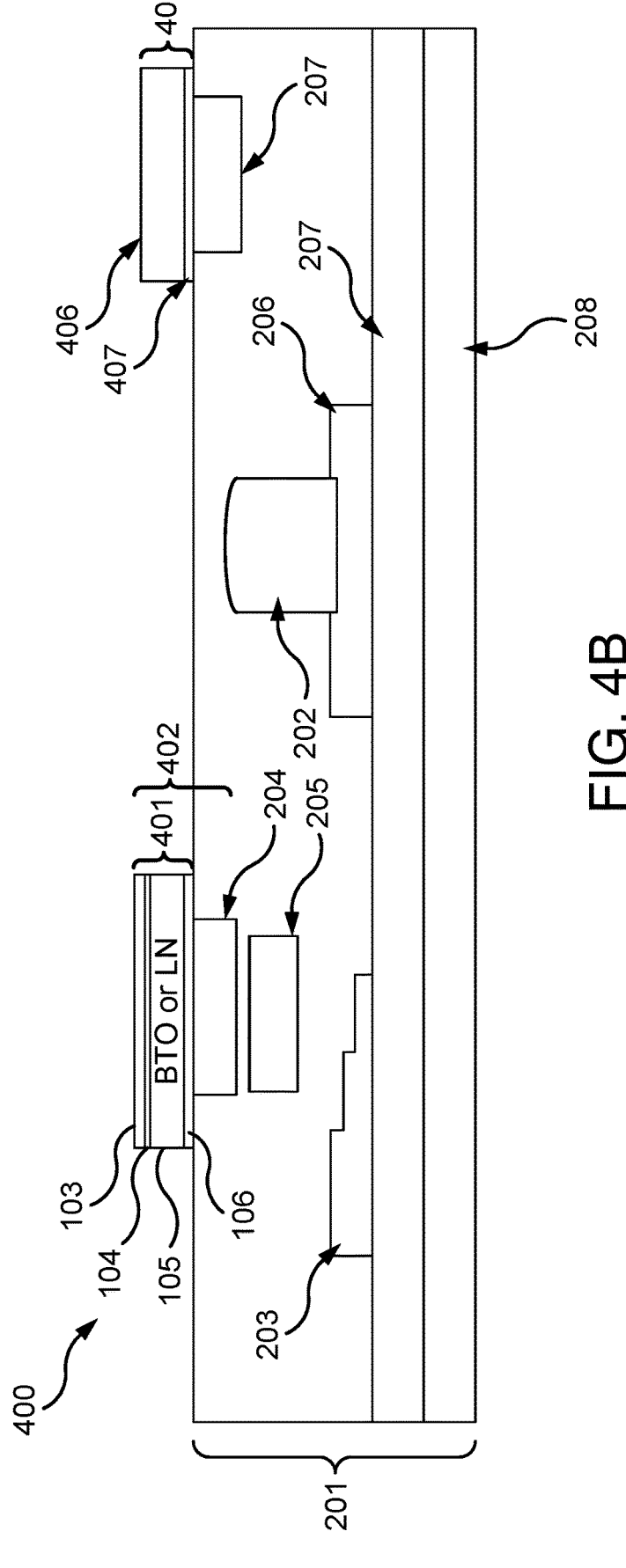
Figure 4C:
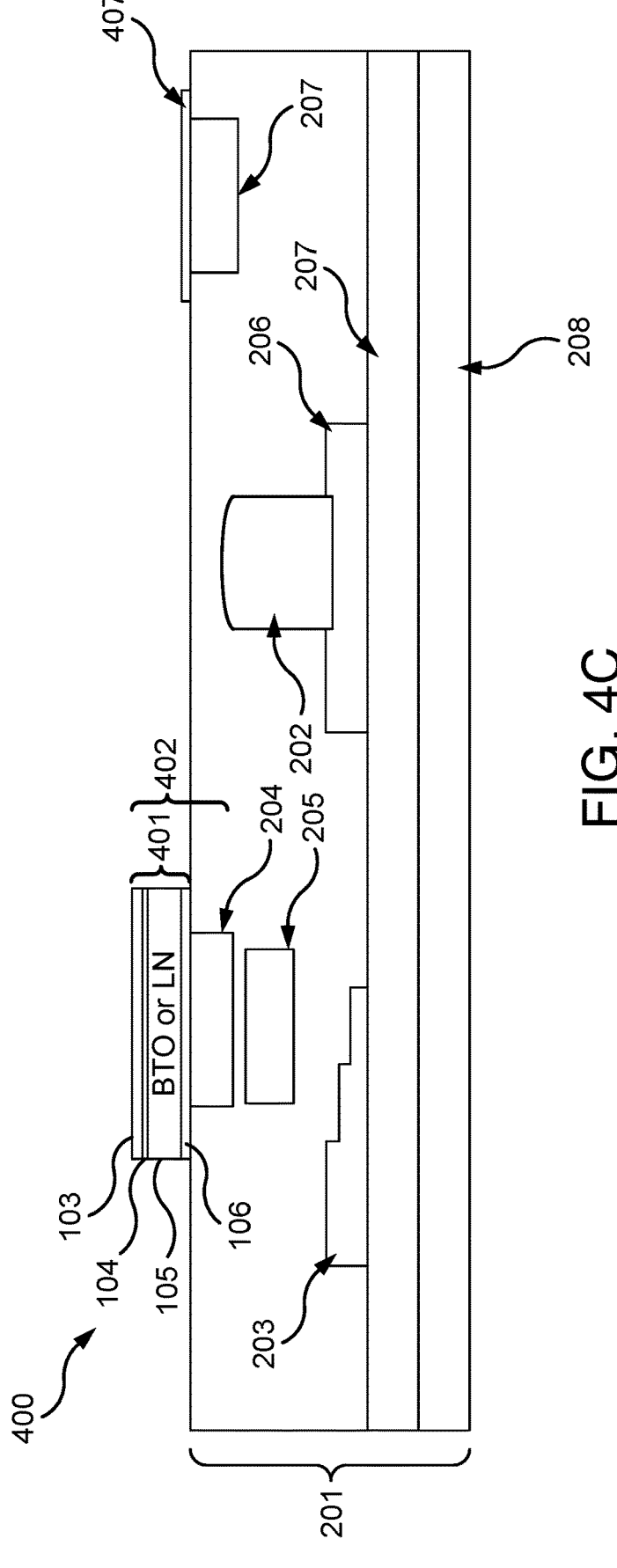

FIG. 4B illustrates attaching a laser chiplet 403 (e.g., an III-V laser epi chiplet) to the photonic wafer 201, in addition to the BTO or LN chiplet 401. The position of the laser chiplet 403 is such that it will form ridge waveguide with the waveguide 204. The laser chiplet 403 can have Multiple Quantum Well (MQW) or Multiple Quantum Dot (MQD) structure 407. After bonding, a substrate 406 of the laser chiplet 403 is removed as shown in FIG. 4C. This can be followed by additional MEOL and BEOL processing steps similar to shown in FIGS. 6-8 to convert the structure 407 into a laser structure.

Figure 5:
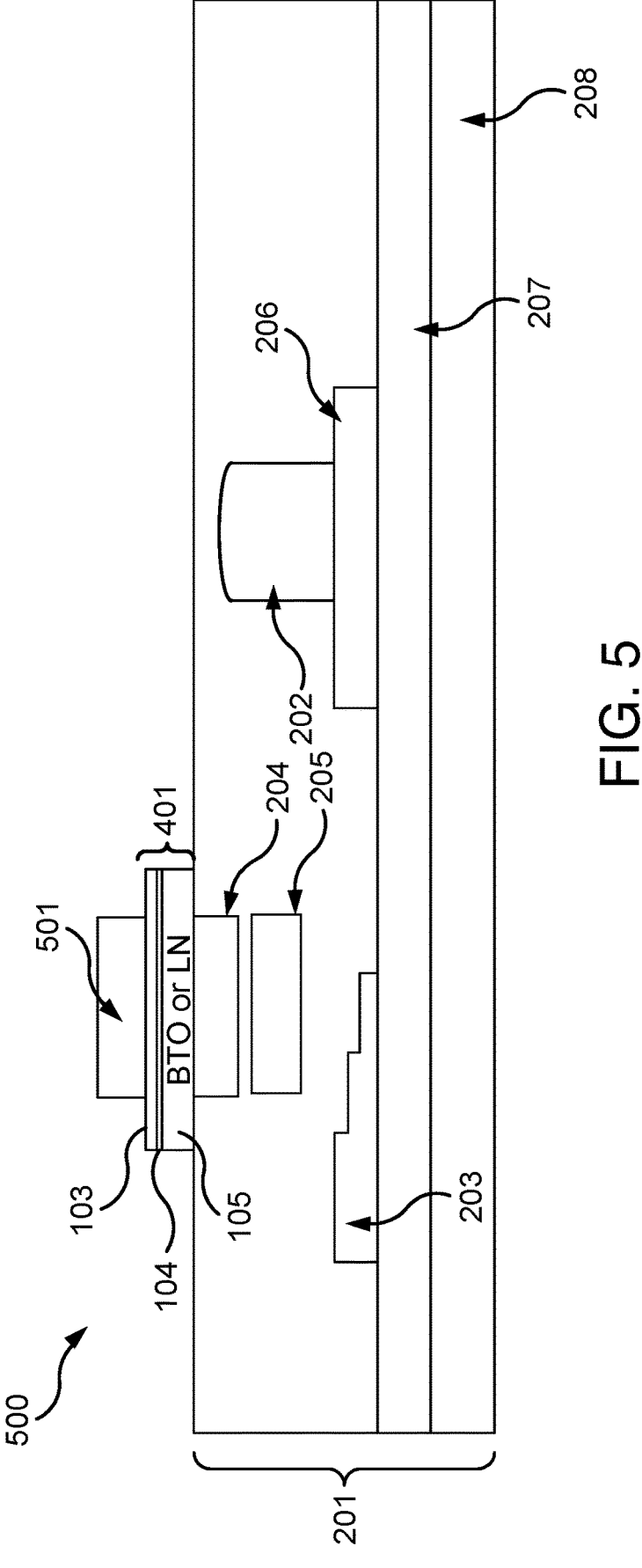
FIG. 5 illustrates the integration of a silicon nitride waveguide with the photonic platform according to one embodiment described herein.

FIG. 5 illustrates an additional embodiment of the device depicted in FIG. 1. In the device 500, a silicon nitride layer 501 is added during MEOL processing to the chiplet 401. For simplicity, the process steps to form silicon nitride layer 501 are not described and can include conventional IC fabrication process steps such as deposition, photolithography, etch, and chemical mechanical processing. The addition of the silicon nitride layer 501 improves phase efficiency and facilitates mode engineering.

Figure 6:
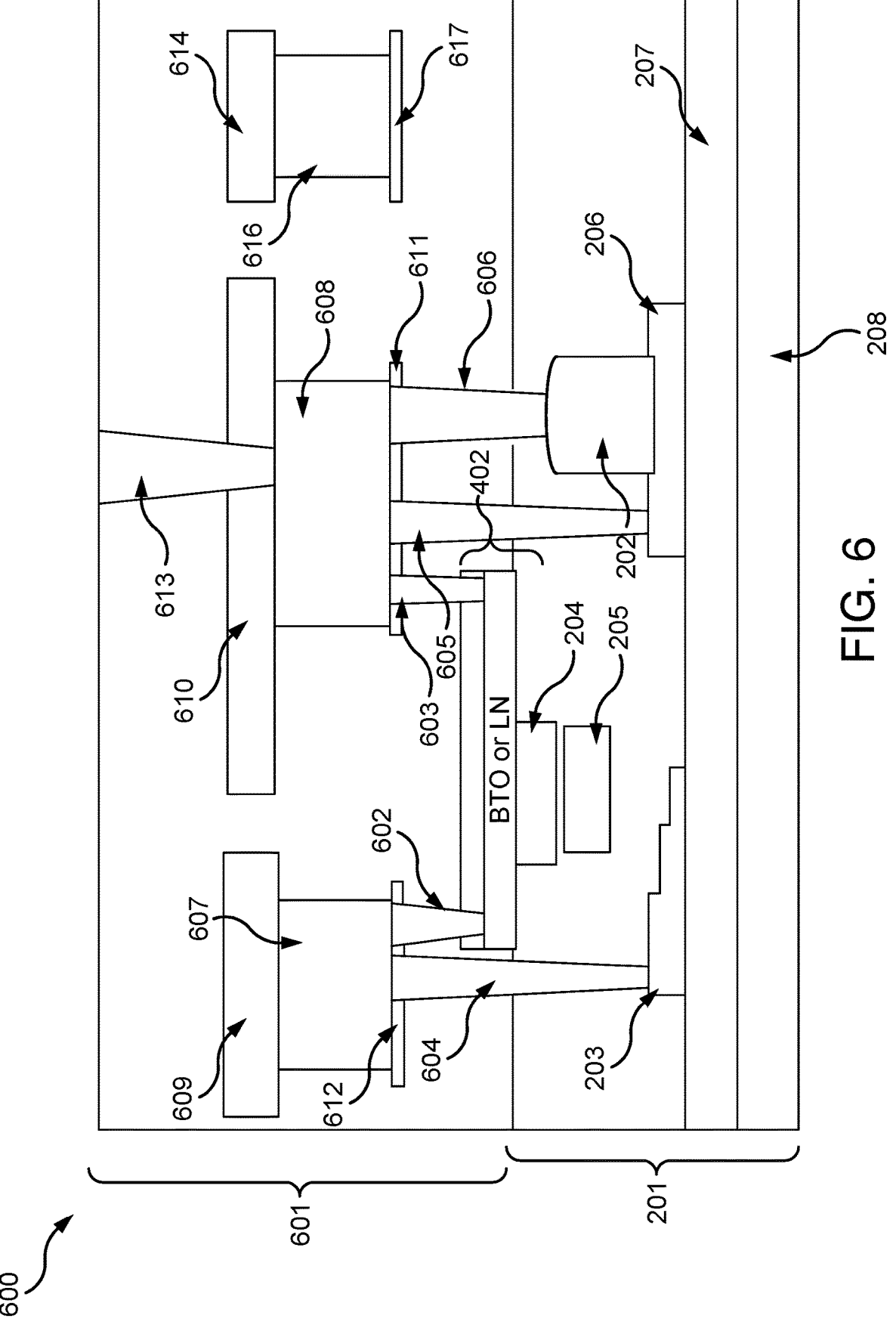
FIG. 6 illustrates additional middle end of line (MEOL) elements added to the photonic platform according to one embodiment described herein.

FIG. 6 illustrates additional MEOL elements added to the device of FIG. 4A to form device 600. Electrodes 602, 603 are added to connect the LN or BTO layer to an electric field. Electrode 602 is located distal from the midline of the LN or BTO layer. Electrode 603 is located distal from both electrode 602 and the midline of the LN or BTO layer. An electric charge applied to electrodes 602 and 603 induces an electric field in the ridge waveguide 402. The applied electric fields allow birefringence and phase adjusting. Additional elements include electrodes 604, 605, and 606, first level metal (M1-A) connection 607, a second first level metal connection (M1-B) 608, and nitride layers 609, 610, and 614. The nitride layers 609, 610, and 614 can be nitride caps to provide an upper diffusion barrier for the metal underneath.

In one embodiment, the layers 609, 610, and 614 are formed by a single layer deposition and etching using photolithography process. Although not shown in FIG. 6, a waveguide (e.g., a nitride waveguide) can also be formed using the same deposition and etching photo lithography process and at the same time the layers 609, 610, and 614 are formed but without having metal layer beneath it. That is, nitride waveguides may be disposed in the same layer of the device 600 as the layers 609, 610, and 614. Electrodes 602, 603, 604, 605, and 606 can be made using tungsten (W) or any other appropriate metals. Inter-metal dielectric layer (IDL) 601 may be formed using multiple deposition, etching, and polishing steps as part of the integration scheme to create metal separating dielectric. The IDL 601 can be tetraethyl orthosilicate (TEOS), silicon, silicon dioxide, or other suitable material, or a combination thereof. Further, the laser structure 407 of FIG. 4C can be added to the structure in FIG. 6, in which case additional steps can be performed to create metal contacts to the laser layer.

Layers 611, 612, and 617 are diffusion barrier layers and are formed using a single deposition and etching using photolithography process. The choice of diffusion barrier layer is dependent on the choice of metal system used for the metal connections 607, 608, and 616.

The M1-A connection 608 may also have a nitride layer 610 located on the proximal side of M1-A connection 608. Nitride layer 610 extends over both sides of M1-A connection 608. M1-A connection 608 forms an electrical connection with the LN or BTO layer 105 through electrode 603. M1-A connection 608 is connected to photodiode 202 through electrode 606. M1-A connection 608 is connected to waveguide 206 through electrode 605.

A second first level metal connection 607 also has a nitride layer 609 located on the proximal side of M1-B 607. The connection 607 is connected to the LN or BTO layer 105 by way of electrode 602. An additional electrode 604 connects the connection 607 with waveguide 203.

Connection 613 is a connection between M1 layers and second metal layer M2 above it (not shown in the figure). While not shown, addition BEOL processes can be performed on the device 600 to form a large number of additional metal layers (for example two to fifteen layers) with electrical connections between them.

Figure 7:
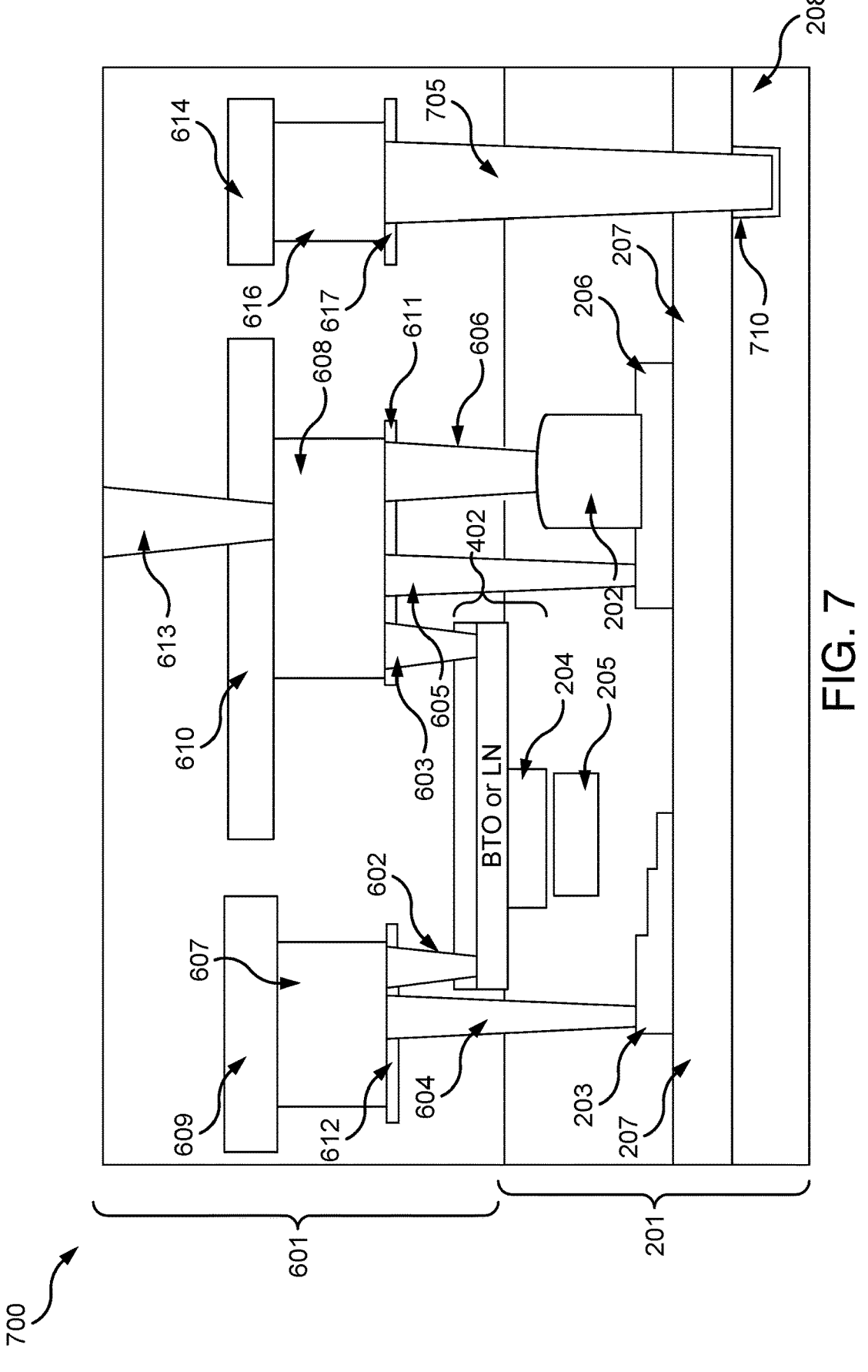
FIG. 7 illustrates additional back end of line (BEOL) elements added to the photonic platform according to one embodiment described herein.

FIG. 7 illustrates another embodiment in which a Through Silicon Via (TSV) 705 is also implemented prior to formation of M1 layer in a device 700. The TSV 705 extends from a metal connection 616 (which is part of the first metal layer) deep inside the Si substrate 208 and provides electrical connection to the back side of the wafer when wafer is thinned to reveal the TSV 705 from back side. Layer 710 is a dielectric that provides electrical isolation between the TSV 705 and substrate 208. Typical thickness of the silicon substrate 208 after thinning (not shown in the figure) may be in the range of 50-125 ums and additional processing steps can be performed to create additional layers on the back side of the wafer.

In another embodiment, a wafer-to-wafer bonding based BEOL flow is described in FIG. 8A through 8D. It is to be noted that a large number of BEOL options are available and the process flow described here is not limiting.

Figure 8A:
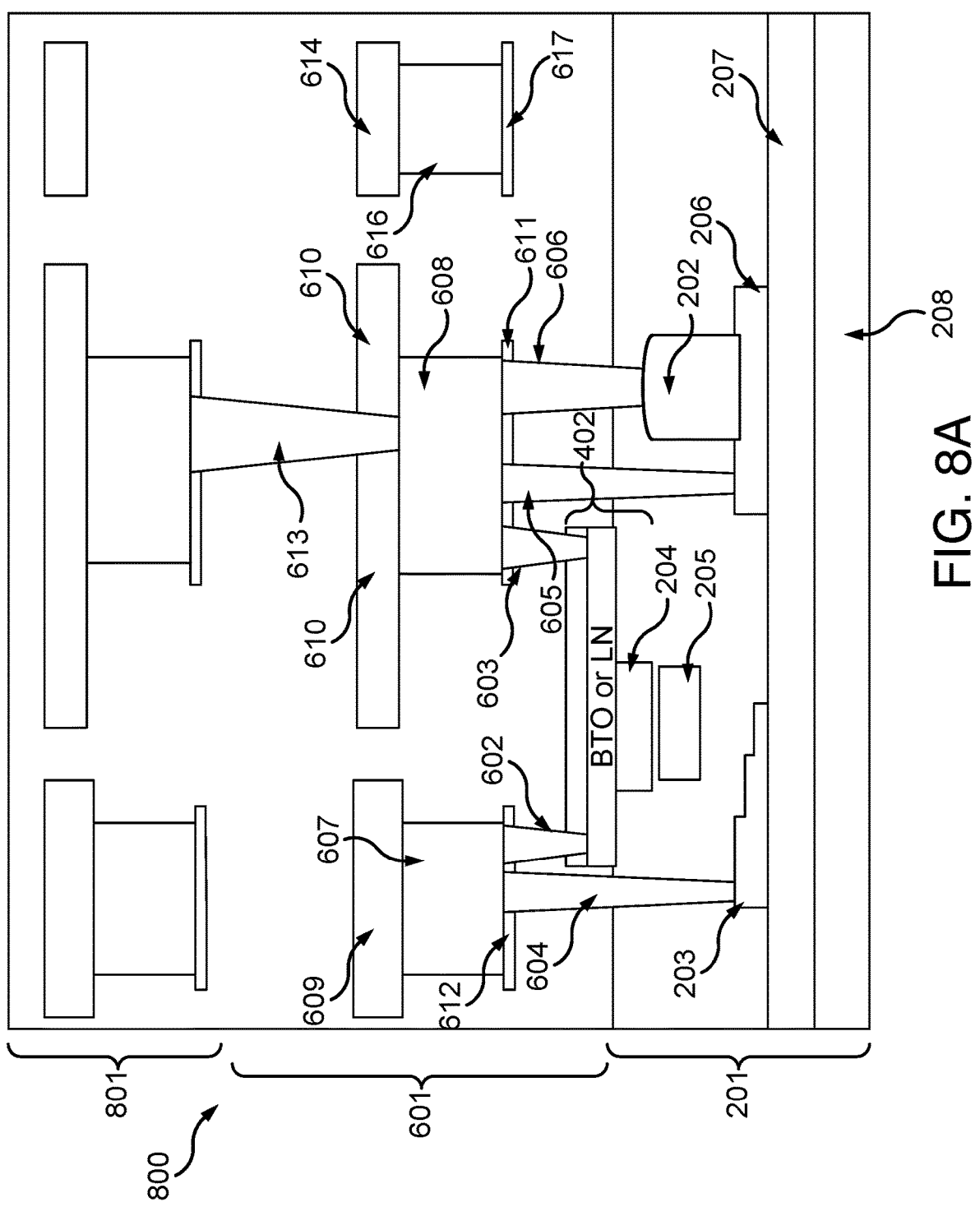
FIG. 8A-8D illustrates bonding a handle wafer and the etching of metal traces.

FIG. 8A shows a silicon photonic wafer 800 with BTO or LN integration and two layers of metals (rather than just one metal layer as shown in FIG. 6). That is, the wafer 800 illustrates a metal layer 801 being added above, and connected to, the IDL 601 to form two metal layers. It is to be noted that the wafer 800 can include any number of metal layers (e.g., only one metal layer or more than two metal layers).

Figure 8B:
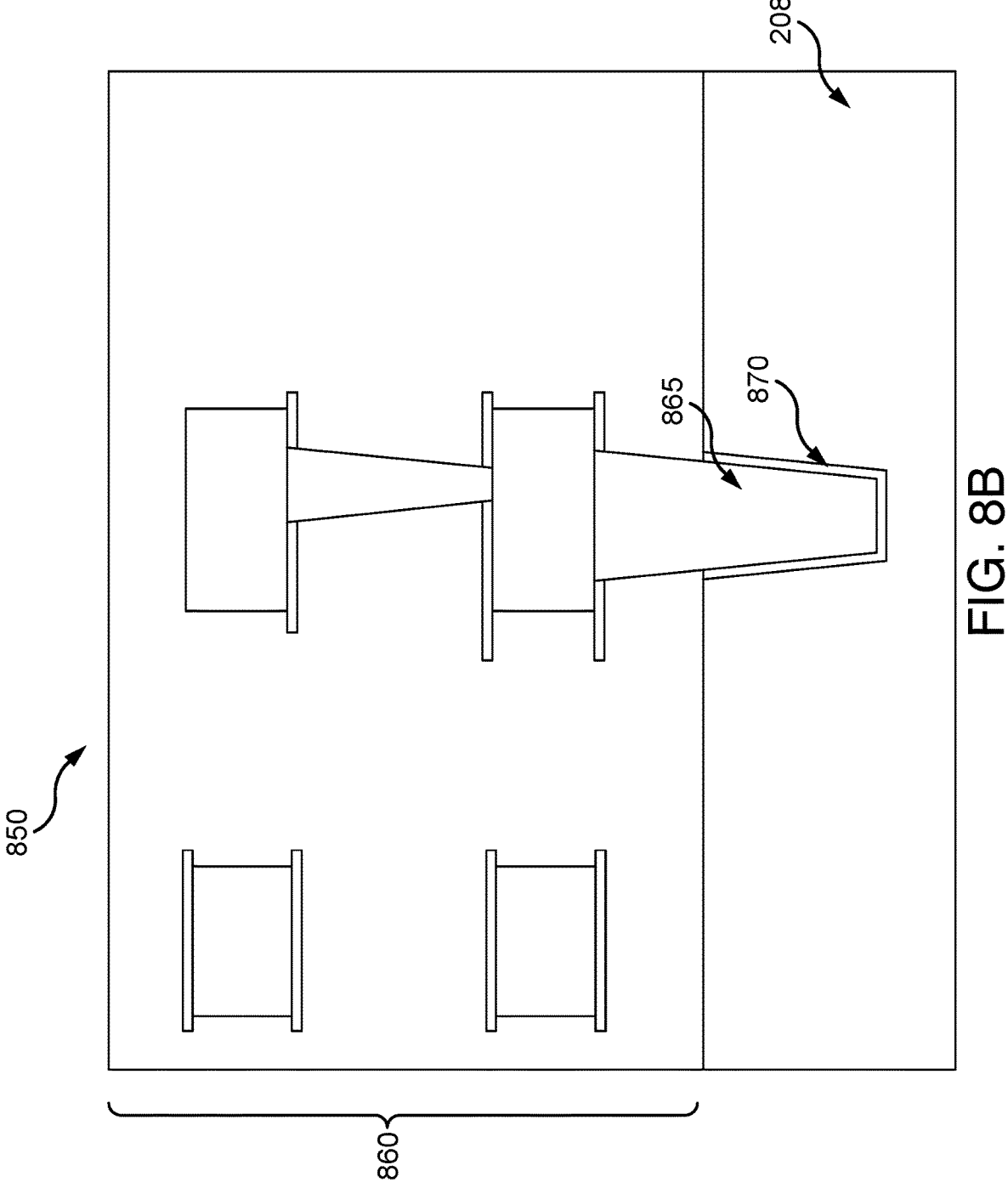

FIG. 8B shows a separate handle wafer 850 that has two metal layers 860 disposed on silicon substrate 208. However, in other embodiments, the wafer 850 may not include any metal layer (and can simply include a dielectric layer on top of the substrate 208). Or the wafer 850 can include only one metal layer, or more than two metal layers. In this example, the wafer 850 also includes an optional TSV 865 that is isolated by a dielectric 870 from the substrate 208.

Figure 8C:
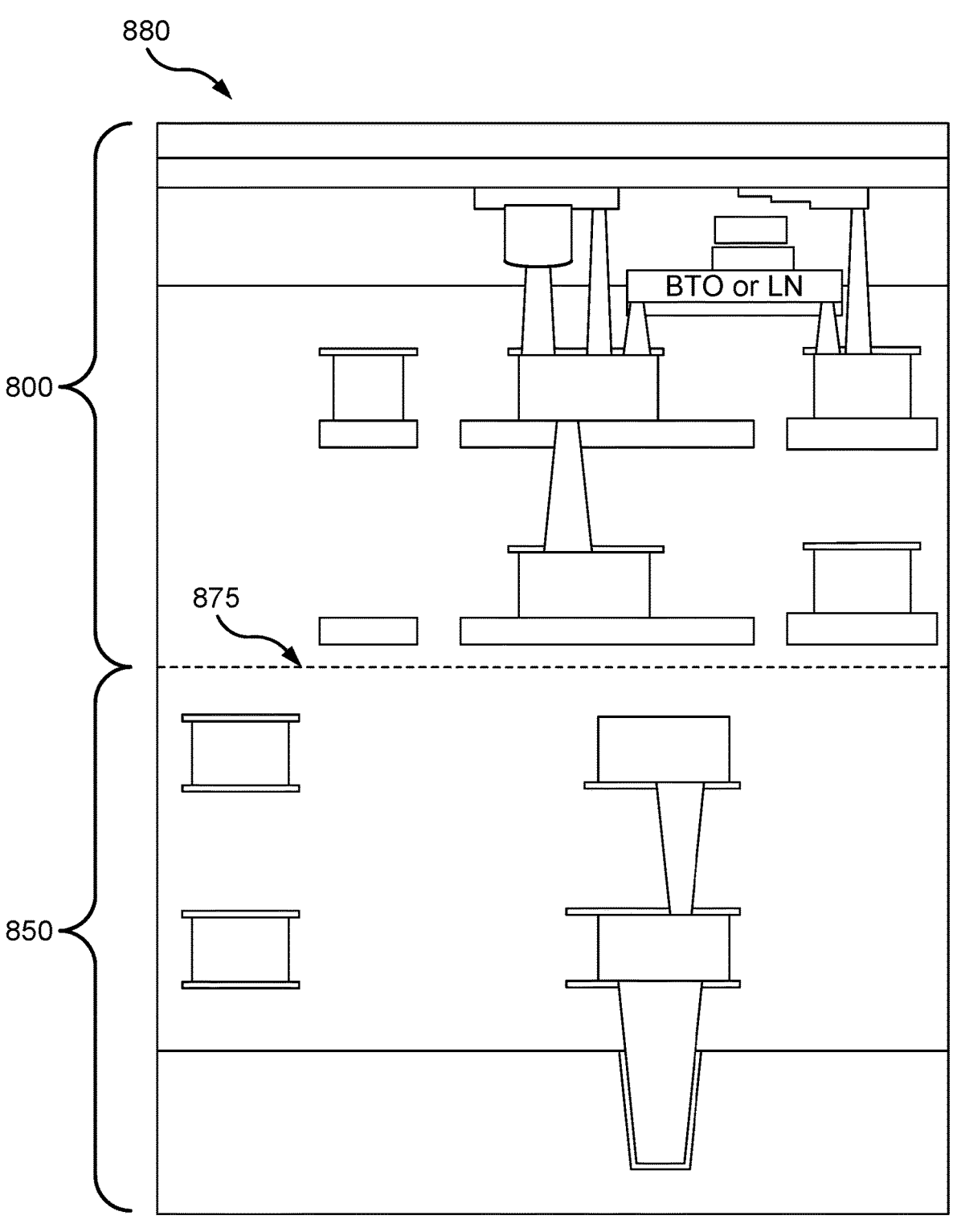
Figure 8D:
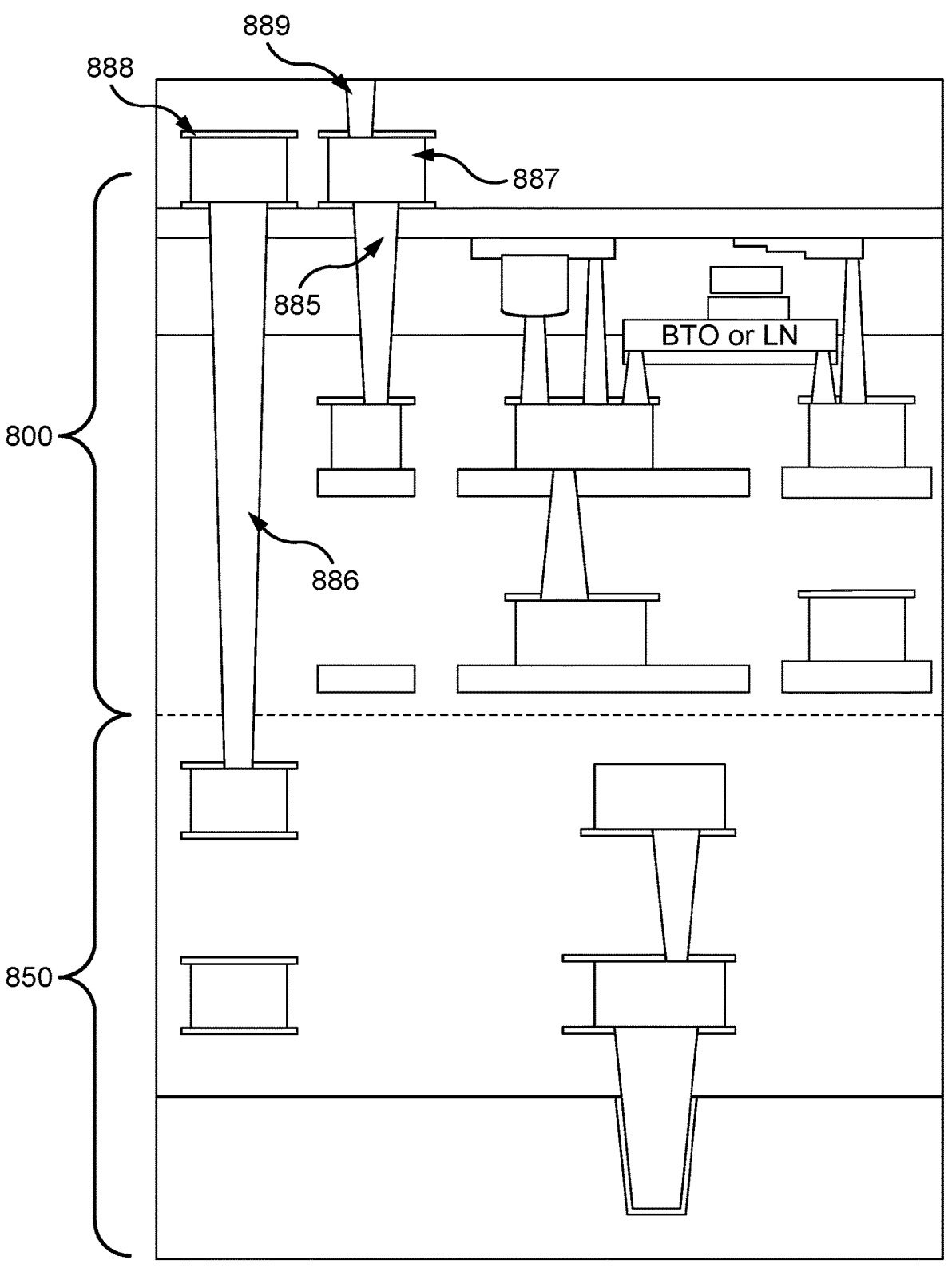

As shown in FIG. 8C, the two wafers 800 and 850 from FIGS. 8A and 8B are bonded at a bonding interface 875 to form a combined wafer 880. FIG. 8D illustrates, after wafer bonding in FIG. 8C, the substrate of the wafer 800 (e.g., a photonic wafer) is removed and a contact 885 (e.g., a via) is formed to at least one metal layer in the wafer 800. Further, in this example, an optional contact 886 (e.g., a via) is also formed to connect to at least one metal layer of the wafer 850 (assuming this handle wafer has a metal layer). After forming the contacts 885 and 886, additional metal layers can be formed that includes the metal routes 887 and 888 and additional contacts such as the contact 889.

Figure 9:
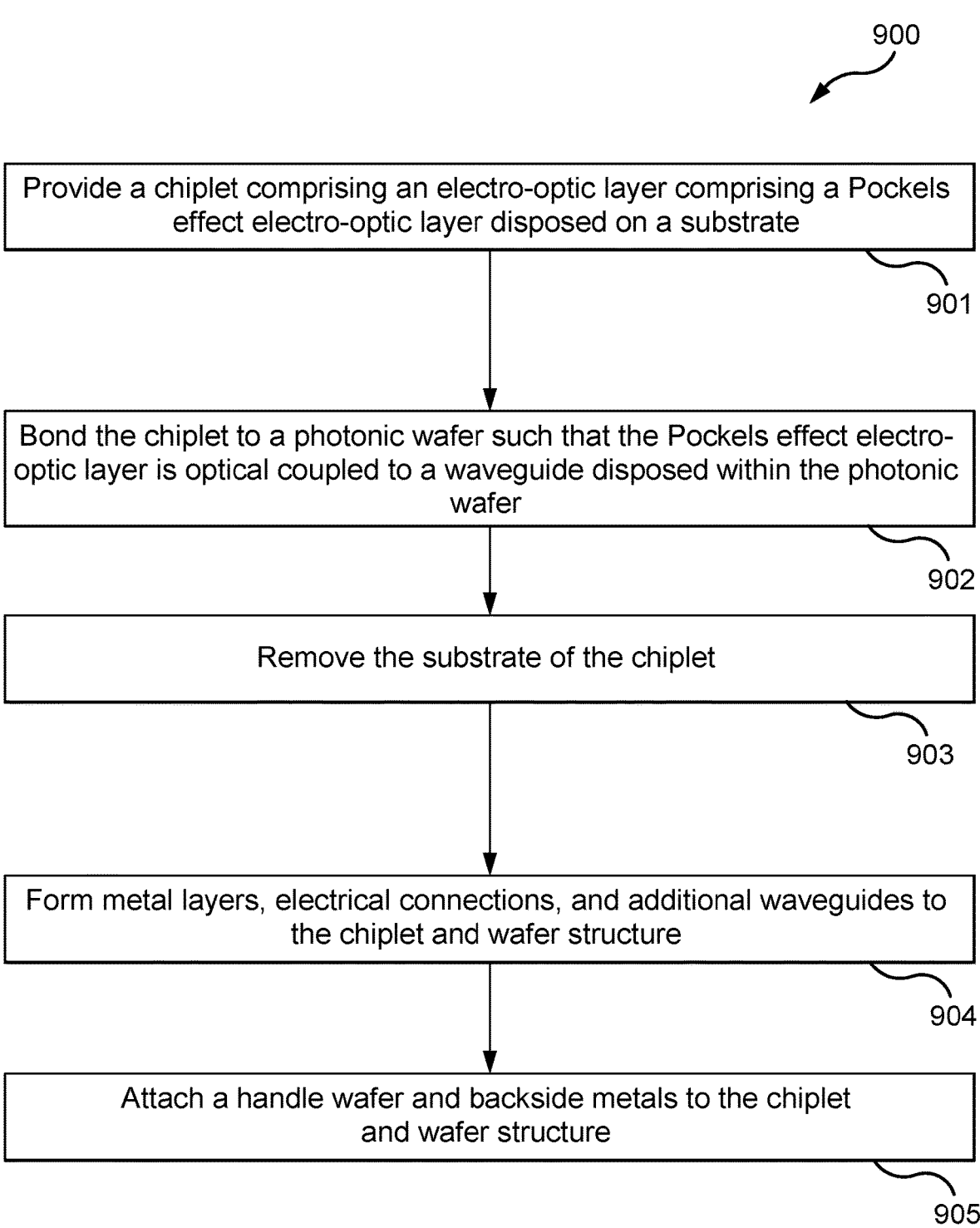
FIG. 9 illustrates a method of manufacturing the photonic platform.

FIG. 9 illustrates a method 900 of manufacture of the photonic platform. Method 900 can refer to the elements in FIGS. 1-8. At block 901 a chiplet 301 that includes a Pockels effect electro-optic layer (e.g., a BTO or LN layer) and a substrate (e.g., the substrate 101 in FIG. 1) is provided. The chiplet 301 may include any of the optional other layers illustrated in FIG. 1.

At block 902, the chiplet is bonded during a MEOL process to a photonic wafer (e.g., wafer 201 in FIG. 2) such that the Pockels effect electro-optic layer is optical coupled to a waveguide (e.g., waveguide 204 in FIG. 2) disposed within the wafer.

At block 903, the substrate of the chiplet is removed. Moreover, in addition to bonding the chiplet to the wafer, the method 900 can include bonding the laser structure (e.g., the laser chiplet 403) to the wafer and removing its substrate 406.

At block 904, metal layers (e.g., metal connections 607 and 608), electrical connections (e.g., connection 613), and additional waveguides are formed on the combined chiplet and photonic wafer structure.

At block 905, a handle wafer (e.g., wafer 850 in FIG. 8C) is attached to the combined chiplet and photonic wafer structure. After attaching the handle wafer, backside metals can (optionally) be formed on the structure, such as the metal routes 888 and 887 shown in FIG. 8D as part of a back end of line (BEOL) process. Note that this block is applicable to FIGS. 8A-8D and may not be used when forming the structures illustrated in FIGS. 6 and 7.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of manufacturing a photonic platform, comprising:
   providing a chiplet comprising:
      a Pockels effect electro-optic layer, and
      a substrate, the method further comprising:

bonding the chiplet to a photonic wafer such that the Pockels effect electro-optic layer is optically coupled to a waveguide disposed within the photonic wafer;

forming a first electrode to form an electrical connection with a first insulator layer distal from a midline of the chiplet or with the Pockels effect electro-optic layer;

forming a metal routing layer, comprising:

a first metal connection electrically coupled to the first electrode, wherein the first electrode is arranged between the metal routing layer and the electro-optic layer;

forming a second electrode, the second electrode extending from the photonic wafer to the first metal connection; and removing the substrate after bonding the chiplet to the photonic wafer.

2. The method of claim 1, wherein the Pockels effect electro-optic layer comprises one of BTO or LN.

3. The method of claim 2, wherein the Pockels effect electro-optic layer does not include silicon.

4. The method of claim 1, further comprising forming a third electrode to form an electrical connection with the first insulator layer of the chiplet distal from both the first electrode and the midline of the chiplet, wherein the first and third electrodes are controlled to generate an electric field in the Pockels effect electro-optic layer and the waveguide.

5. The method of claim 4, wherein forming the first and third electrodes is part of a back end of line (BEOL) process.

6. The method of claim 5, wherein forming the metal routing layer is part of the BEOL process.

7. The method of claim 1, further comprising:

performing a front end of line (FEOL) process to form the waveguide in the photonic wafer, wherein bonding the chiplet is part of a Middle End of Line (MEOL) process.

8. The method of claim 7 further comprising, adding a second waveguide between the waveguide and a substrate of the photonic wafer.

9. The method of claim 7 further comprising: bonding a laser structure to a same surface of the photonic wafer as the chiplet is bonded to.

10. A silicon photonic platform comprising:

a semiconductor wafer comprising a waveguide;

a Pockels effect electro-optic layer disposed over, and optically coupled to, the waveguide;

a first electrode electrically coupled to a first end of the Pockels effect electro-optic layer;

a second electrode electrically coupled to a second end of the Pockels effect electro-optic layer wherein a wafer bondline is disposed between the Pockels effect electro-optic layer and the waveguide;

a first metal routing layer, comprising:

a first metal connection electrically coupled to the first electrode, wherein the first electrode is arranged between the first metal routing layer and the electro-optic layer; and a third electrode extending from the semiconductor wafer to the first metal connection.

11. The silicon photonic platform of claim 10, wherein the Pockels effect electro-optic layer is bonded to the semiconductor wafer as a Middle End of Line (MEOL) process.

12. The silicon photonic platform of claim 10, wherein the Pockels effect electro-optic layer and the waveguide form a ridge waveguide.

13. The silicon photonic platform of claim 12, wherein a second waveguide is disposed within the semiconductor wafer between the waveguide and a substrate of the semiconductor wafer.

14. The silicon photonic platform of claim 12, wherein the Pockels effect electro-optic layer comprises one of BTO or LN.

15. The silicon photonic platform of claim 14, wherein the Pockels effect electro-optic layer does not include any silicon.

16. The silicon photonic platform of claim 15, further comprising a laser structure in a same layer as the Pockels effect electro-optic layer.

17. The silicon photonic platform of claim 15, wherein the Pockels effect electro-optic layer is disposed between the first metal routing layer and the waveguide.

18. The silicon photonic platform of claim 17, further comprising a through silicon via connecting the first metal routing layer to a substrate of the semiconductor wafer.

19. The silicon photonic platform of claim 17, further comprising a second metal routing layer connected to the first metal routing layer, wherein the first and second metal routing layers are formed in a Back End of Line (BEOL) processes.

* * * * *